United States Patent [19]
Densmore

[11] 4,130,940
[45] Dec. 26, 1978

[54] BOOM LENGTH SENSING AND INDICATING SYSTEM WITH SELF-SYNCHRONIZATION

[75] Inventor: Dennis G. Densmore, Waverly, Iowa

[73] Assignee: Koehring Company, Brookfield, Wis.

[21] Appl. No.: 861,370

[22] Filed: Dec. 16, 1977

[51] Int. Cl.$^2$ .............................................. G01B 3/12
[52] U.S. Cl. ................................... 33/139; 116/124 F
[58] Field of Search .......... 116/124 F, 129 B, 129 H, 116/129 N; 33/125 R, 133, 139, 134 R, 138, 142, 141.5, 136; 340/267 C, 379; 235/92 DN, 92 MP, 92 MT, 92 K, 92 A; 318/603, 685, 696

[56] References Cited

U.S. PATENT DOCUMENTS

| | | | |
|---|---|---|---|
| 3,780,440 | 12/1973 | Taylor | 33/139 |
| 3,812,589 | 5/1974 | Schultheis | 33/139 |

*Primary Examiner*—Harry N. Haroian

[57] ABSTRACT

A boom length sensing and indicating system for a crane of the type having an operator's cab, in which changes in the extended length of the boom are sensed and a signal representative of the sensed changes is generated. The changes are sensed and the representative signal generated by a cable that winds and unwinds from a reel mounted on the boom in response to changes in boom length. A boom length indicator mounted in the cab of the crane has a movable dial or pointer to indicate the extended length of the boom. A stepping motor connected to the indicator receives the generated signal representative of the sensed changes and drives the indicator by an amount and in a direction related to the sensed changes. A pair of stops cooperate with the indicator to prevent movement of the indicator beyond predetermined upper and lower extremities of indicator movement regardless of sensed changes in the extended length of the boom, thereby providing self-synchronization of the indicator.

9 Claims, 5 Drawing Figures

BOOM LENGTH SENSING AND INDICATING SYSTEM WITH SELF-SYNCHRONIZATION

BACKGROUND OF THE INVENTION

The present invention relates to cranes having extendible booms and, more particularly, to a system for sensing and indicating the length of an extendible boom of a crane.

In operation a crane with an extendible boom, many factors are important in determining the stability of the crane the maximum load rating conditions under various conditions of boom position. For example, maximum load rating conditions for the boom depend upon certain operating conditions including boom length and boom angle. The stability of the crane is also dependent upon these conditions as well as other factors such as the orientation of the boom relative to the body of the crane.

While the operator may be able to estimate factors such as boom length and angle, more accurate indications may be required when operating the crane near the maximum load and/or stability limits. Accordingly, various systems have been devised to provide more accurate indications of boom length, boom angle and boom orientation. Such systems are typically complex and accordingly quite expensive and may still provide less than optimum accuracy.

One known system shown in U.S. Pat. No. 3,922,789 determines boom length electrically by measuring the resistance of a cable that varies in length with boom length. Another known system utilizes a potentiometer which varies in electrical resistance in direct proportion to boom length. In each system, the resistance measurements are converted into a boom length indication for operator display.

For example, in the known system using potentiometer resistance, the potentiometer is mechanically rotated by a reel that has a cable wound thereon with its free end attached to the uppermost movable section of the crane boom. The varying potentiometer resistance is connected in a circuit with a constant reference voltage, and a precision meter in the circuit deflects in proportion to the resistance of the potentiometer. Once scaled in terms of boom length, the meter provides a direct readout of boom length. However, the system is expensive due to the requirements for a constant voltage source, precision meter readout device and the like. Moreover, mechanical slippage, or deterioration of potentiometer resistance, corrosion of wire or brushes or chage in the reference voltage can result in inaccuracies that can become extreme over a long time period.

OBJECTS AND BRIEF SUMMARY OF THE INVENTION

It is accordingly an object of the present invention to provide a novel boom length sensing and indicating system which overcomes the foregoing and other problems of the prior art and yet is relatively inexpensive, extremely accurate and reliable.

It is another object of the present invention to provide a novel boom length indicating system which may be incorporated into an existing two-block condition sensing system.

It is yet another object of the present invention to provide a novel boom length indicating system which provides a boom length indication that is self-synchronizing during use.

These and other objects and advantages of the present invention are accomplished through the provision of a system which senses changes in the length of an extendible boom of a crane and indicates the length to the operator on an indicator dial in the cab of the crane. Stops or the indicator dial prevent movement of the dial beyond upper and lower limits to provide for indicator dial synchronization.

Specifically, changes in the length of the boom are sensed by sensing the changes in the length of a cable that varies in length in response to variations in boom length. One end of the cable is wound on a take-up reel mounted on a non-extending portion of the crane boom and the other end of the cable is secured to the uppermost movable section of the crane boom. As boom length varies, the cable length varies in direct relation. Cable length variations result in the generation of pulses that are indicative of an incremental amount and direction of changes in boom length. The generated pulses are transmitted to a stepping motor that drives the boom length indicator dial in the cab of the crane. Minimum and maximum stops mounted on the indicator dial prevent the dial from turning beyond upper and lower extremities of indicated boom length. These upper and lower extremities of indicated boom length correspond to upper and lower extremities of actual boom length. These dial stops prevent the stepping motor from driving the dial beyond these extremities of indicated boom length, so the system synchronizes itself in use.

DETAILED DESCRIPTION

Figure 1:
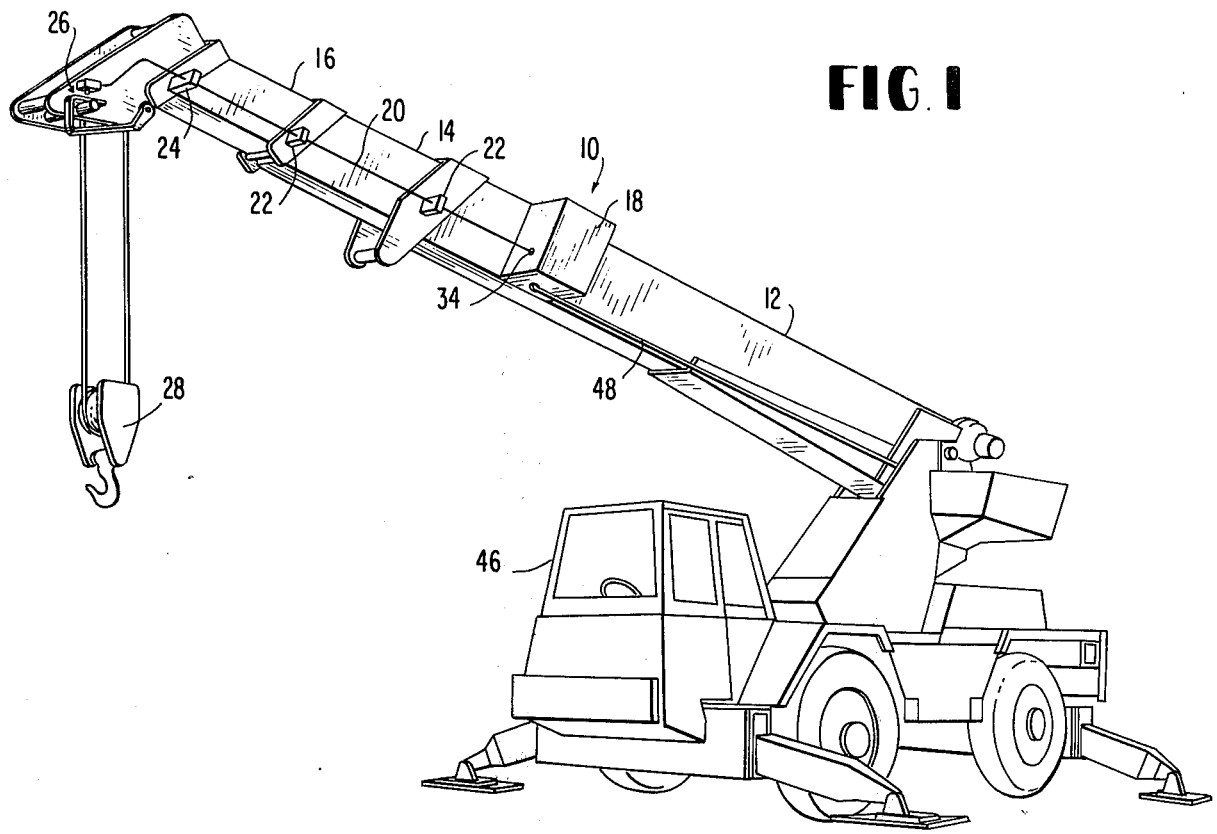
FIG. 1 is a view in elevation of a crane equipped with a boom length and two-block sensing system in accordance with the present invention.
Figure 2:
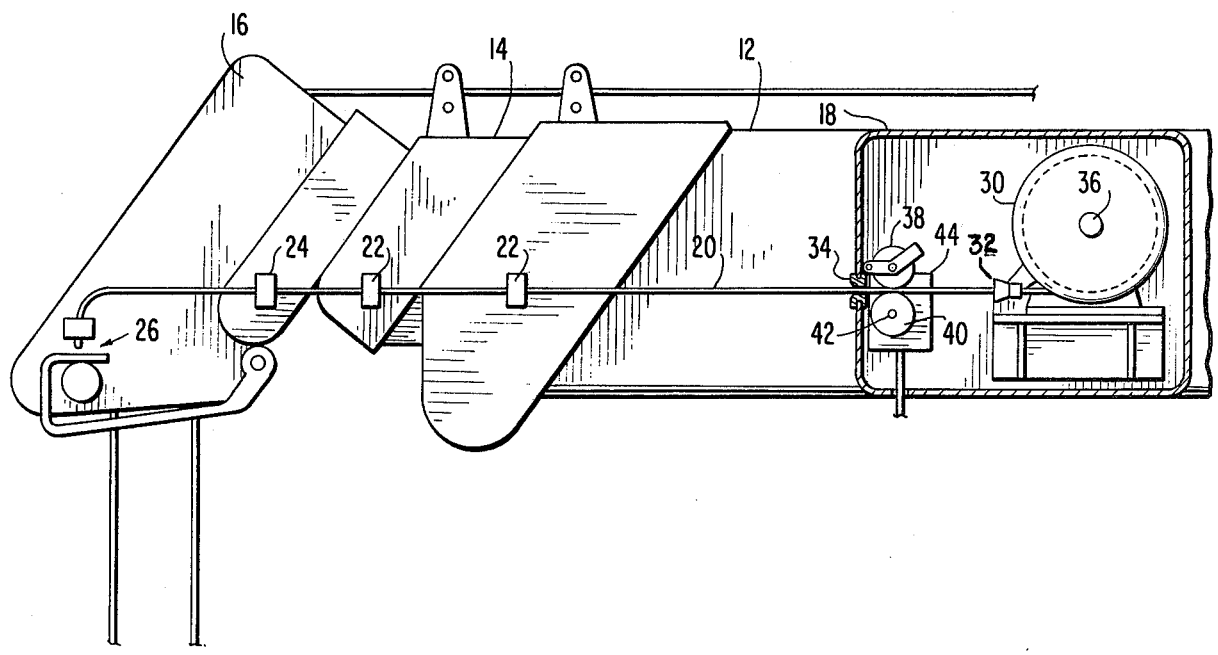
FIG. 2 is a view in elevation of a portion of the boom illustrating the reel and signal generator assemblies of the system of FIG. 1 in greater detail.

FIGS. 1 and 2 generally illustrate a crane having an extendible boom 10 including a fixed portion 12 and movable portions 14 and 16. A reel and signal generator assembly 18, described hereinafter in greater detail, is mounted on the fixed portion 12 of the boom 10. A cable 20 passes through an opening in the housing of the assembly 18 and through suitable guides 22 mounted on the section 12 and 14 of the boom. The cable 20 is connected to the uppermost movable portion of the boom in any suitable manner as is generally illustrated at 24.

An anti-two-block sensor 26 may be provided as described in U.S. Pat. No. 3,922,789. This sensor senses the imminent engagement of the end or head of the crane boom and the block 28 as is described in the referenced patent. The cable 20 may be part of the anti-two-block system described in the referenced patent, or a separate cable and reel assembly utilized solely for sensing boom length as described herein may be provided.

As is illustrated more clearly in FIG. 2, the cable 20 is wound on a reel 30 and passes through a guide member 32 and an aperture 34 in the assembly 18. The reel 30 is conventionally mounted for rotation about an axis 36 and is biased in a suitable conventional manner (e.g. with a spring) so as to place in tension the portion of the cable 20 between the fixture 24 and the reel 30. This bias tends to wind the cable 20 onto the reel 30 so that any slack in the cable is always wound onto the reel, i.e. is self-winding. Such a reel and cable assembly is described in greater detail in U.S. Pat. No. 3,922,789 referenced above.

In the illustrated embodiment, the cable 20 passes between opposed rollers or pulleys 38 and 40 mounted on the fixed portion 12 of the boom. The pulley 40 is fixed in position while the pulley 38 is spring biased to maintain the cable in driving engagement with the pulley 40. The cable thus passes through the pulleys 38 and 40 as it winds and unwinds in response to changes in boom length, resulting in rotation of the pulleys proportional to changes in boom length.

The pulley 40 includes a drive shaft 42 that connects to a signal generator 44 and drives the generator. The signal from the signal generator 44 is supplied to the cab 46 of the crane over a cable 48 as is schematically shown. The anti-two-block signal may be supplied to the cab 46 over this same cable 8, although over a different wire or wires in the cable.

The signal generator 44 generates a signal related both to the amount and to the direction of any changes in the length of the cable 20 and thus in the length of the boom. This signal is preferably an electrical pulse signal. Each pulse indicates that the boom has moved a certain distance. The order in which the pulses occur indicates the direction of movement. This pulse signal is translated into movement to drive an indicator in the cab as is schematically illustrated in FIGS. 3 and 4.

Figure 3:
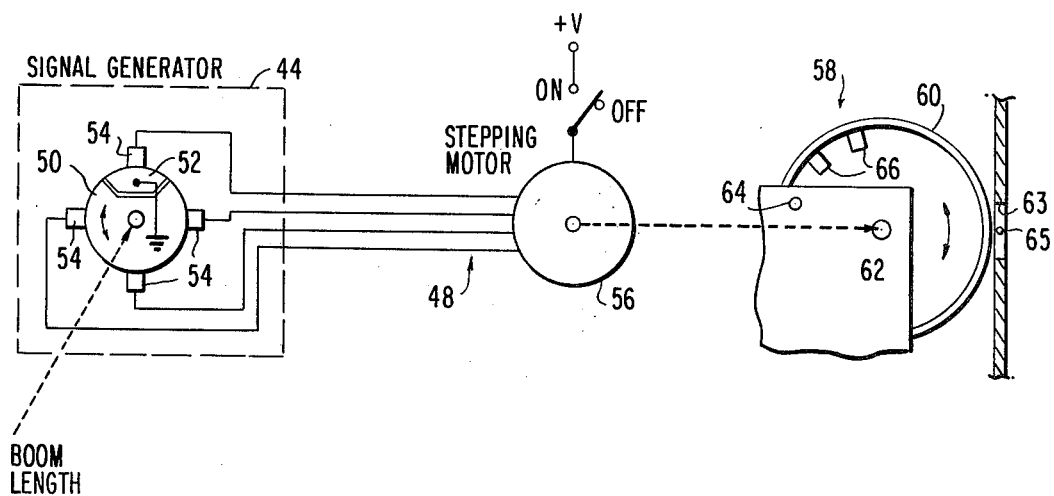
FIG. 3 is a schematic diagram of one embodiment of the boom length sensing and indicating system of the invention showing one form of signaling device on the boom.
Figure 4:
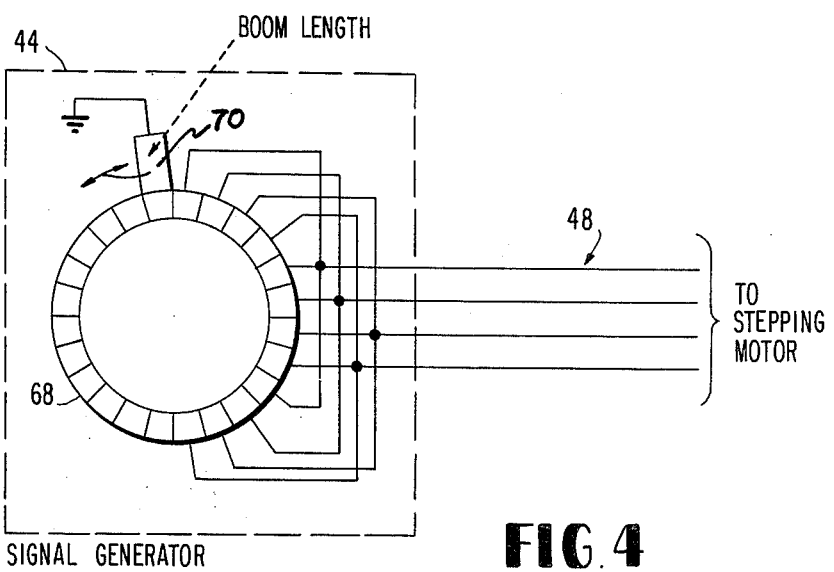
FIG. 4 is a schematic diagram of another form of signaling device that may be used in the embodiment of FIG. 3.

FIGS. 3 and 4 illustrate two embodiments of the signal generator 44, either of which may be used in conjunction with a motor and indicator mounted in the cab of the crane. In FIG. 3 embodiment, the drive pulley 40 of FIG. 2 drives a commutator 50 either directly or through a suitable linkage. The commutator 50 includes a grounded segment 52. As the commutator is rotated by the drive pulley in response to changes in boom length, the segment 52 comes into contact with brushes 54 spaced at fixed positions about the periphery of the commutator. The brushes are connected through the cable 48 to a suitable conventional stepping motor 56 mounted in the cab 46 (FIG. 1). Between the generator and stepping motor there may be a signal modifier (not shown) which, if necessary, converts the pulses into signals compatible with the stepping motor's design. The stepping motor in turn drives an indicator 58 to indicate boom length to the crane operator.

In the illustrated embodiment, the stepping motor 56 is a conventional, four wire stepping motor and thus the signal generator is provided with four equidistantly spaced brushes 54 as illustrated. Each brush 54 is connected to one of the four input terminals of the motor 56 and connects that terminal to ground as the segment 52 rotates into contact with the brush. A positive voltage +V is supplied to the motor 56 through an ON/OFF switch in the cab so that the crane operator can turn the boom length indicator on or off by disconnecting the power. Thus, with the switch in the ON position, the voltage source is connected to the motor 56 and a complete circuit exists through one motor section by way of the grounded one of the brushes.

Figure 3A:
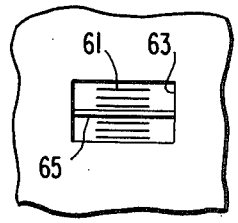
FIG. 3A is a view of the indicator of FIG. 3.

The indicator 58 may include any suitable indicator dial such as the illustrated drum type dial 60. The dial 60 is mounted for rotation about an axis 62 and is driven by the motor 56 either directly or through a suitable coupling. As is shown in FIG. 3A, indicator 61 can be seen through an opening 63 in the operator's control panel in the cab of the crane to provide, when aligned with a suitable marker 65, and indication of boom length.

Mounted in fixed relation to the dial 60 is a fixed stop 64 such as dowel or other member protruding into the interior of the dial 60. Limit stops 66 are mounted on the dial 60 to engage two positions of dial movement representing the fixed stop at respective upper and a lower extremities of boom length indication on the dial. These upper and lower indicator extremities correspond to respective upper and lower limits of boom length.

It will be appreciated that as the commutator 50 of the signal generator rotates in response to boom length changes, the stepping motor is incrementally driven in proportion to boom length changes. Thus, for example, a two inch increase in boom length may result in the generation of one pulse which may in turn cause the stepping motor 56 to step clockwise by a one degree increment (corresponding to a change of two inches in the indication on the dial 60). As the boom length continues to increase until it reaches its maximum limit or extremity, the stepping motor 56 will have driven the dial 60 until the limit stop 66 on the right in FIG. 3 has been rotated into engagement with the fixed stop 64. Of course, this engagement may occur before the actual boom length reaches its extremity in which case the engagement of the stops 64 and 66 will prevent movement of the dial beyond its upper extremity. The signal generator will, however, continue to generate pulses until the boom length is at its maximum. But these pulses will be dissipated by the motor 56 without turning the motor because of the engagement of the stops.

It will be appreciated that the same procedure will occur in the direction of the minimum extremity of boom length. While decreases in boom length may occur beyond the point at which the dial 60 is at its lower limit and therefore in the stops, these decreases in boom length, while generating a "decrease" signal, will not effect movement of the dial 60. Accordingly, the indicator dial is automatically synchronized while the crane is in use. If the dial is correct, i.e. there is no slippage of cable 20 between pullyes 38 and 40, changes in boom length will not occur beyond the engagement of the limit stops. On the other hand, changes in sensed boom length will occur beyond one or the other limit of the dial if the dial synchronization is inaccurate. The changes in sensed boom length, however, will not be noted on the dial 60 (because of the limit stops) and the dial 60 will effectively synchronize or calibrate itself through this procedure.

FIG. 4 illustrates an alternative embodiment of the signal generator 44. The embodiment of FIG. 4 includes a commutator 68 that has equal segments of a number divisible by four (the number of input wires to the stepping motor driven by the generator 44). The commutator segments are connected to the four wire cable 48 in the illustrated pattern or in any other suitable manner. The commutator is fixed and a grounded brush 70 is rotated about the commutator in contact with the segments in response to boom length changes. In this manner, a pulse signal indicative of the amount and direction of boom length changes is generated and supplied to the stepping motor 56.

The further operation of the indicating system utilizing the FIG. 4 signal generator is the same as that described previously in connection with FIG. 3, so the operation will not be repeated here. It should be appreciated, however, that various signal generating devices may be utilized in accordance with the invention.

The presently disclosed embodiment is to be considered in all respects as illustrative and not restrictive. The scope of the invention is indicated by the appended claims rather than the foregoing description, and all changes which come within the meaning and range of equivalency of the claims are therefore intended to be embraced therein.

What is claimed is:

1. A boom length indicating system for a crane of the type having an operator's cab comprising:
    means mounted on the boom of the crane for sensing changes in the extended length of the boom and for generating a signal representative of the sensed changes;
    a boom length indicator mounted in the cab of the crane and movable to indicate the extended length of the boom;
    means drivingly connected to the indicator for receiving the generated signal representative of the sensed changes and driving the indicator by an amount and in a direction related to the sensed changes; and,
    means cooperating with the indicator to prevent movement of the indicator beyond predetermined upper and lower extremities of indicator movement regardless of sensed changes in the extended length of the boom.

2. The boom length indicating system of claim 1 wherein said receiving and driving means comprises a stepping motor having a drive shaft connected to the boom length indicator.

3. The boom length indicating system of claim 1 wherein said sensing and signal generating means includes:
    a cable wound on a reel and having a free end connected to an uppermost movable portion of the crane boom, the reel being mounted for rotation on a fixed portion of the crane boom and being biased in a direction tending to wind the cable onto the reel; and
    signal generator means for generating an electrical signal representative changes in the length of said cable.

4. The boom length indicating system of claim 3 wherein said receiving and driving means comprises a stepping motor having a drive shaft connected to the boom length indicator.

5. The boom length indicating system of claim 4 wherein said signal generator means comprises means for generating electrical pulses each representing an amount of movement of said cable relative to said fixed portion of the crane boom.

6. A boom length indicator for sensing and indicating the extended length of an extendible boom of a crane comprising:
    means mounted on the crane boom and responsive to changes in boom length for generating a signal indicative of an incremental amount and direction of changes in the boom length;
    a stepping motor mounted in the cab of the crane and receiving said generated signal, the stepping motor including a rotor shaft that rotates through an angle of rotation and in a direction both determined by the generated signal received from the generating means;
    a movable indicator dial driven by the stepping motor rotor shaft and including indicia of extended boom length at predetermined locations on the dial; and
    stop means mounted on the indicator dial for stopping the movement of the dial at predetermined upper and lower extremities of indicated boom length such that the indicator dial synchronizes itself as the length of the boom is varied to upper and lower extremities.

7. A boom length indicator for sensing changes in the extended length of an extendible boom of a crane and for indicating the extended length in the cab of the crane comprising:
    a reel mounted for rotation on a nonextendible portion of the crane boom;
    an elongated, flexible member wound on the reel and having a free end connected to the uppermost extendible portion of the crane boom;
    biasing means for biasing the reel in a direction of rotation tending to wind the flexible member onto the reel, whereby said reel is selfwinding and rotates in a direction and by an amount related to the free length of the flexible member between the reel and the uppermost extendible portion of the crane boom;
    means responsive to changes in the free length of the flexible member for generating an electrical signal indicating the amount of said changes and the direction of said changes; and,
    means mounted in the cab of the crane and movable in response to said electrical signal from said generating means for indicating the extended length of the crane boom, said indicating means having a dial with length indication thereon and moving in a direction and by an amount determined by said electrical signal, the indicating means including stop means connected to prohibit movement of the dial above an upper and a lower limit regardless of the indication of changes beyond these limits by the electrical signal.

8. A boom length indicating system for a crane of the type having an operator's station comprising:
    means adapted to be mounted on the boom of the crane for sensing changes in the extended length of the boom for generating a signal representative of the sensed changes;
    a boom length indicator adapted to be mounted in the cab of the crane and movable to indicate the extended length of the boom;
    means drivingly connected to the indicator for receiving the generated signal representative of the sensed changes and driving the indicator by an amount and in a direction related to the sensed changes; and,
    means cooperating with the indicator to compensate for error between the actual extended length of the boom and the signal generated by virtue thereof.

9. In a boom length indicating system for an extendible boom of a crane having an operator's station, said system comprising:
    a rotary element adapted to be mounted for rotation on a nonextendible portion of the crane boom;
    an elongated, flexible member frictionally engaging said element and having a free end adapted to be connected to the uppermost extendible portion of the crane boom;

generator means adapted to be mounted on the boom, connected to said element and responsive to changes in the length of the boom for generating an electrical pulse signal indicating the amount and direction of said changes;

a stepping motor adapted to be mounted at the operator's station and movable in response to said electrical pulse signal from said generating means; and a movable indicator adapted to be positioned adjacent the operator's station and driven by the stepping motor for indicating the extended length of the crane boom.

* * * * *